US007650636B2

(12) United States Patent
Lee et al.

(10) Patent No.: US 7,650,636 B2
(45) Date of Patent: Jan. 19, 2010

(54) NETWORK SECURITY ENHANCEMENT METHODS AND DEVICES

(75) Inventors: Pamela Lee, San Jose, CA (US); Wai Wong, Daly City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1145 days.

(21) Appl. No.: 10/793,535

(22) Filed: Mar. 3, 2004

(65) Prior Publication Data

US 2005/0198491 A1 Sep. 8, 2005

(51) Int. Cl.
*G06F 15/16* (2006.01)
*G06F 17/00* (2006.01)
*H04L 29/06* (2006.01)

(52) U.S. Cl. .............................. 726/14; 726/12; 713/152
(58) Field of Classification Search ............... 726/12, 726/14; 713/152
See application file for complete search history.

(56) References Cited

U.S. PATENT DOCUMENTS 6,643,701 B1 * 11/2003 Aziz et al. .................. 709/227
7,197,766 B1 * 3/2007 Ræstad et al. ................ 726/14
2002/0083345 A1 * 6/2002 Halliday et al. ............. 713/201
2006/0064750 A1 * 3/2006 Kersey et al. ................ 726/14

OTHER PUBLICATIONS

R. Khare and S. Lawrence "Upgrading to TLS Within HTTP/1.1", Agranat Systems, Inc., May 2000, RFC 2817, pp. 1-13.
N. Freed, "Behavior of and Requirements for Internet Firewalls", Sun, Oct. 2000, RFC 2979, pp. 1-7.
S. Bellovin, Ed., J. Schiller, Ed. and C. Kaufman, Ed., "Security Mechanisms for the Internet", Internet Architecture Board, Dec. 2003, RFC 3631, pp. 1-20.
International Search Report dated Aug. 1, 2008 from PCT Application No. PCT/US05/05970.
Written Opinion dated Aug. 1, 2008 from PCT Application No. PCT/US05/05970.

* cited by examiner

*Primary Examiner*—Benjamin E Lanier
(74) *Attorney, Agent, or Firm*—Weaver Austin Villeneuve & Sampson LLP

(57) ABSTRACT

Methods and devices are provided for securely transmitting sensitive information over the Internet to and from a first device in a home network that lacks the ability to communicate according to a secure protocol. Communications between the first device and a second device within the home network may proceed according to a non-secure protocol, such as HTTP. However, the second device has the ability to communicate with the outside world via a secure protocol, such as HTTPS. Various implementations of the invention allow the first device to avail itself of the secure communications provided by the second device.

19 Claims, 7 Drawing Sheets

Congratulations! Your information has been received. Please press "Continue" to transfer information to your device. — 405

Continue — 410

NETWORK SECURITY ENHANCEMENT METHODS AND DEVICES

BACKGROUND OF THE INVENTION

1. Field of the Invention

The present invention relates to network technology. More particularly, the present invention relates to enhancing security for devices that are sharing content on a network, e.g., a home network.

2. Description of the Related Art

FIG. 1 illustrates an exemplary home network 105. As used herein, a "home network" refers to any private network, including but not limited to a private network controlled by an individual, a family, a business, a public entity, etc. However, the paradigm case of a home network is literally a network in a home.

Home network 105 includes device 110 (a camera in this example) and personal computer 115, both of which are connected to Internet 120 via gateway 125 and modem 130. Here, gateway 125 is a network device with network address translation ("NAT") and firewall capabilities that can hide the home network behind a single IP address. Many cable or DSL service providers use dynamically assigned IP addresses. Therefore, the IP address assigned to network 105 will change over time.

The present assignee provides various applications and devices for home networks, including those necessary to allow web hosting from a home network. One such application provides dynamic domain name server ("DDNS") functionality, which allows web hosting through a single domain name even when the IP address assigned to the home network keeps changing.

In order to set up DDNS, a device (e.g., camera 110) from home network 105 must communicate sensitive information to a third party (e.g. server 135) via Internet 120. Such information may include, for example, a username, a password and billing information. It is not acceptable to transmit this information in a non-secure format ("in the clear") over Internet 120. Unfortunately, camera 110 may not have the ability to use a secure protocol such as HTTPS.

It would also be desirable to provide methods and devices for securely transmitting sensitive information over the Internet to and from a device in a home network, even if the device does not support a secure protocol such as HTTPS.

SUMMARY OF THE INVENTION

Methods and devices are provided for securely transmitting sensitive information over the Internet to and from a first device in a home network that lacks the ability to communicate according to a secure protocol. Communications between the first device and a second device within the home network may proceed according to a non-secure protocol, such as HTTP. However, the second device has the ability to communicate with the outside world via a secure protocol, such as HTTPS. Various implementations of the invention allow the first device to avail itself of the secure communications provided by the second device.

Some implementations of the invention provide a method for securely transmitting information to and from a home network. The method includes these steps: making a request on a first device within the home network for a first form at a URL on a second device within the home network, wherein the request is made via a non-secure protocol; entering sensitive information in the first form via the first device, the sensitive information pertaining to the second device; transmitting the first form to a third device outside the home network from the first device via a secure protocol; receiving a second form on the first device from the third device via the secure protocol, the second form containing the sensitive information; and sending the second form to the second device via the non-secure protocol.

The non-secure protocol may be HTTP and the secure protocol may be HTTPS. The transmitting step may involve invoking one of a "GET" or "POST" HTTP action command and transmitting a return URL for the second device.

Some embodiments of the invention provide a device configured for use within a home network for securely transmitting information to and from the home network. The device includes: an apparatus for making a request within the home network for a first form at a URL on a second device within the home network, wherein the request is made via a non-secure protocol; an input device for entering sensitive information in the first form via the device, the sensitive information pertaining to the second device; and a controller for transmitting the first form to a third device outside the home network from the device via a secure protocol and for receiving a second form from the third device via the secure protocol, the second form containing the sensitive information. The apparatus is also configured for sending the second form to the second device via the non-secure protocol.

Some embodiments of the invention provide a computer program embodied in a machine-readable medium and configured to control at least one device within a home network to perform the following steps: making a request on a first device within the home network for a first form at a URL on a second device within the home network, wherein the request is made via a non-secure protocol; entering sensitive information in the first form via the first device, the sensitive information pertaining to the second device; transmitting the first form to a third device outside the home network from the first device via a secure protocol; receiving a second form on the first device from the third device via the secure protocol, the second form containing the sensitive information; and sending the second form to the second device via the non-secure protocol.

Alternative implementations of the invention provide another method for securely transmitting information to and from a home network. The method includes these steps: receiving, at a first device within the home network, a request from a second device within the home network, wherein the request is received via a non-secure protocol; and providing a first graphical user interface to the second device via the non-secure protocol in response to the request. The first graphical user interface includes fields for receiving information regarding the first device and a first control configured to transmit the information to a third device outside the home network via a secure protocol in response to a first input from a user of the first device. The method may be implemented in one or more devices, e.g., via computer software.

Other implementations of the invention provide another method for securely transmitting information to and from a home network. The method includes the following steps: receiving, at a first device outside the home network, a request received via a secure protocol from a second device within the home network, the request including information regarding a third device within the home network; and providing a first graphical user interface to the second device via the secure protocol in response to the request. The first graphical user interface includes a first control configured to transmit the information to the third device in response to a first input from a user of the second device. This method may also be implemented in one or more devices, e.g., via computer software.

BRIEF DESCRIPTION OF THE DRAWINGS

FIG. 4 is an example of a graphical user interface that may be used in performing some methods according to the invention.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Methods and devices are provided for securely transmitting sensitive information over the Internet to and from a first device in a home network (such as camera 110) that lacks the ability to communicate according to a secure protocol. Secure communications between a home network and devices on the Internet are typically provided by software bundled with the browser of a personal computer (such as PC 115) within the home network. The present invention allows the first device to use the secure communications provided by the personal computer.

Figure 2:
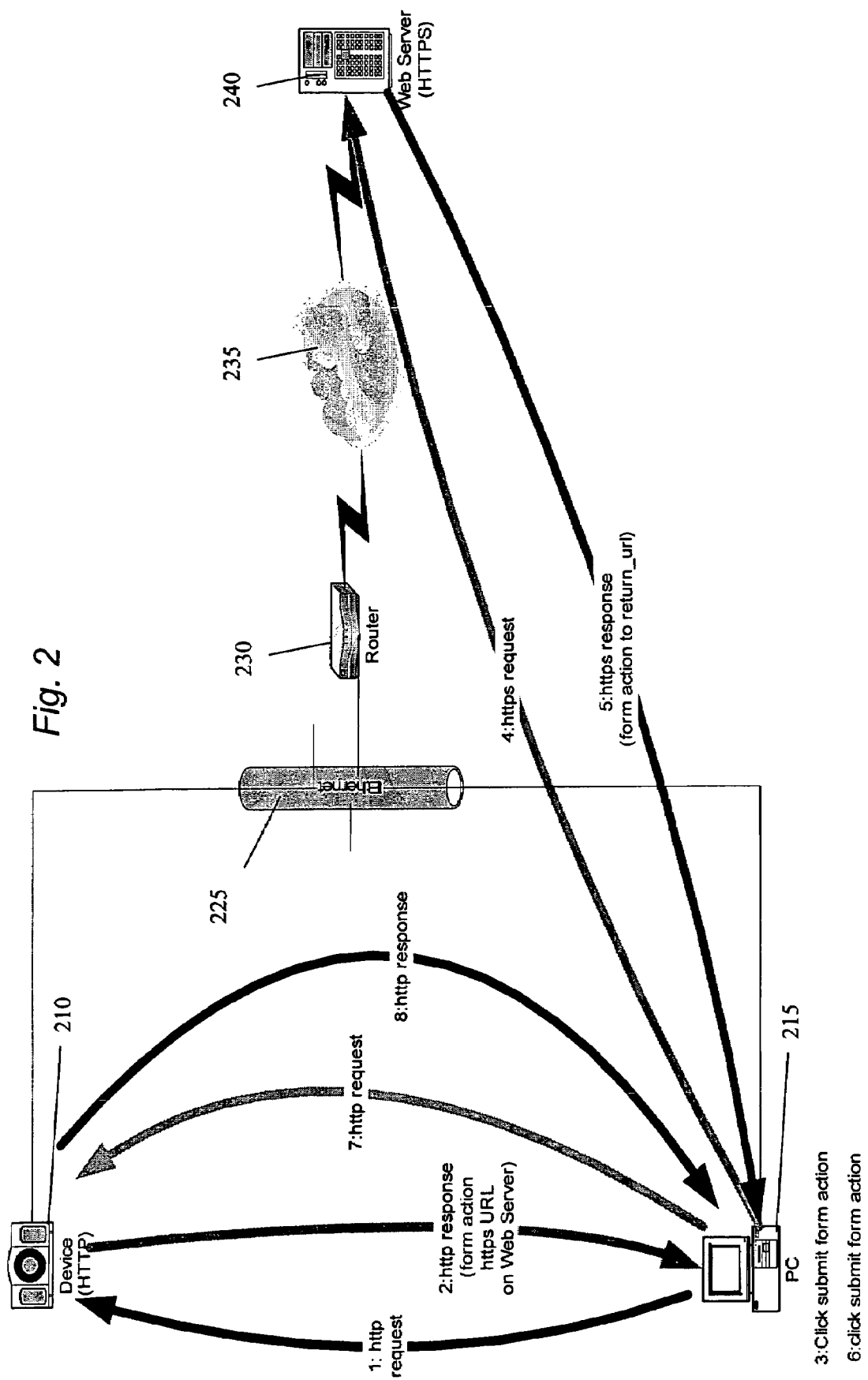
FIG. 2 is a network diagram with superimposed arrows illustrating steps of a method according to the invention.

FIG. 2 illustrates one such method according to the invention. In this example, device 215 of a home network is a PC and device 210 is a camera. However, device 215 could be any other device known in the art with the necessary software, user interface, etc. For example, device 215 could be a personal digital assistant, a workstation, etc. Device 210 could be an audio device, a video device, etc.

In step 1 of FIG. 2, device 215 makes a request to device 210 via a non-secure protocol. Here the request is for the uniform resource locator ("URL") of device 210 and is made via Hypertext Transfer Protocol ("HTTP"). However, other information regarding the device may be requested and any other convenient protocol known in the art may be used.

In step 2, device 210 returns an HTTP-based browser form to device 215. The browser form is a graphical user interface that includes fields for entering information and a region configured as a control, such as an "action" button or a similar device, that is responsive to input (e.g., a mouse click) from a user of device 215. The control specifies an action that points to a URL of a device outside of the home network. In some implementations, the control specifies an action that points to a URL of web server 240 of a DDNS service provider.

Figure 3:
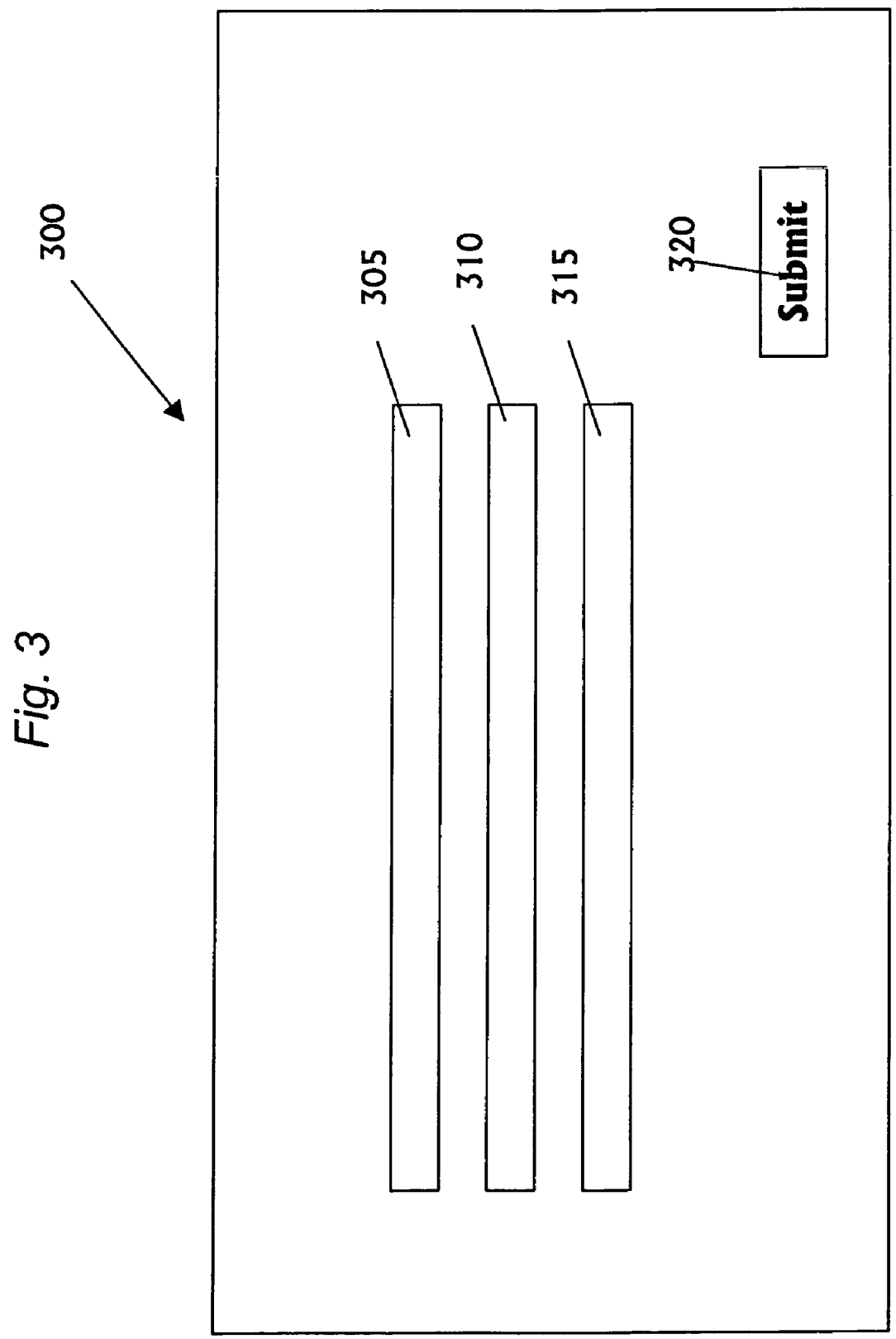
FIG. 3 is an example of a graphical user interface that may be used in performing some methods according to the invention.

In one implementation, the browser form has the format illustrated in FIG. 3. Fields 305, 310 and 315 allow a user of device 215 to enter information regarding device 210 and/or the home network. For example, form 300 may include instructions prompting a user to enter user identification information in field 305, a password in field 310 and financial information (e.g., a credit card number) in field 315. Region 320 of form 300 is an "action" control configured as a "Submit" button that is responsive to engagement by a user of device 215, e.g., by a mouse click, a key stroke, etc.

It will be appreciated by those of skill in the art that the form could be configured differently. For example, more or fewer fields may be used, other information could be included, etc. In some implementations, device 210 includes all required information and there are no fields provided for a user of device 215 to enter additional information. Moreover, other commands may be used. In alternative implementations, a "GET" "action" command is used instead of a "POST" "action" command.

In step 3 of FIG. 2, a user of device 215 enters information into the fields of the form and engages control 320. This action submits a request via a secure protocol to web server 240 (step 4). In this example, information entered into fields 305, 310 and 315 is sent as variables to an HTTPS-based URL of server 240: along with the field-based variables, a variable called "return_url" is also passed. "return_url" is a fully qualified URL to device 210 that server 240 will use in its form action target.

In step 5, server 240 acts on the variables sent in the request. Here, server 240 sends a secure response via HTTPS protocol. Preferably, the response returns a form with the same variables defined hidden from the user. In some implementations, the response is a form having a "POST" action specified by the "return_url" variable. In other implementations, the response is a form having a "GET" action command in which the variables are sent as part of the URL.

According to some implementations, the response of step 5 is in the general format indicated by browser form 400 of FIG. 4. In this example, form 400 includes message 405 indicating the successful receipt of information by server 240. Form 400 does not require the user to take any further action other than activating "Continue" button 410, thereby sending the variables to the HTTP-based URL of device 210 (step 7). In some implementations, device 215 automatically performs step 7 with no action required from a user.

Device 210 stores the passed variables (e.g., in its configuration files) and/or acts upon these variables. Preferably, device 210 returns a response to device 215 (e.g., via HTTP), indicating the successful completion of the process.

Figure 5:
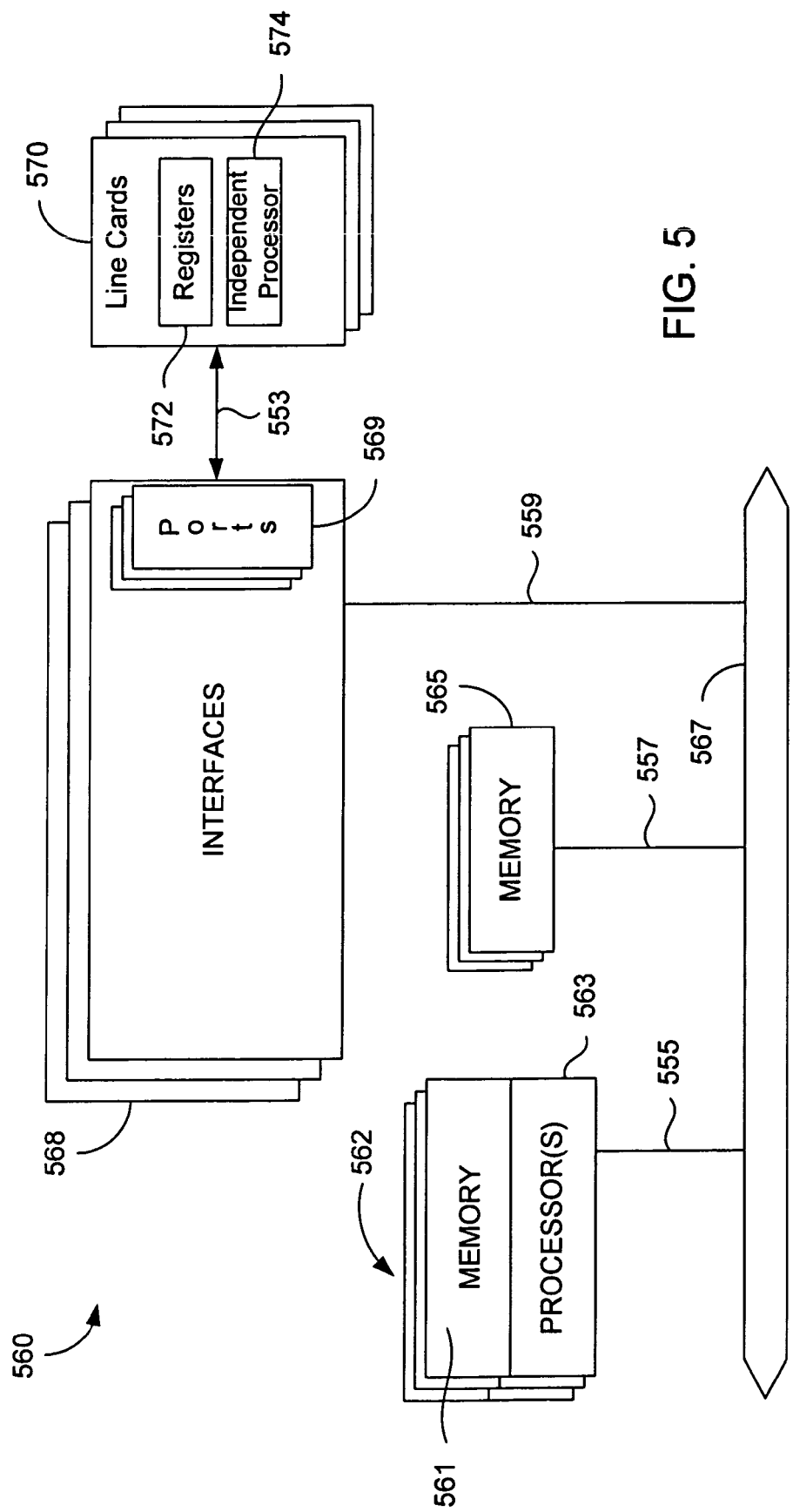
FIG. 5 illustrates an example of a network device that may be configured to implement some methods of the present invention.

FIG. 5 illustrates an example of a network device that may be configured to implement some methods of the present invention. Network device 560 includes a master central processing unit (CPU) 562, interfaces 568, and a bus 567 (e.g., a PCI bus). Generally, interfaces 568 include ports 569 appropriate for communication with the appropriate media. In some embodiments, one or more of interfaces 568 includes at least one independent processor 574 and, in some instances, volatile RAM. Independent processors 574 may be, for example ASICs or any other appropriate processors. According to some such embodiments, these independent processors 574 perform at least some of the functions of the logic described herein. In some embodiments, one or more of interfaces 568 control such communications-intensive tasks as media control and management. By providing separate processors for the communications-intensive tasks, interfaces 568 allow the master microprocessor 562 efficiently to perform other functions such as routing computations, network diagnostics, security functions, etc.

The interfaces 568 are typically provided as interface cards (sometimes referred to as "line cards"). Generally, interfaces 568 control the sending and receiving of data packets over the network and sometimes support other peripherals used with the network device 560. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 562 may be responsible for implementing specific functions associated with the functions of a desired network device. According to some embodiments, CPU 562 accomplishes all these functions under the control of software including an operating system (e.g. Linux, VxWorks, etc.), and any appropriate applications software.

CPU 562 may include one or more processors 563 such as a processor from the Motorola family of microprocessors or the MIPS family of microprocessors. In an alternative embodiment, processor 563 is specially designed hardware for controlling the operations of network device 560. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data, programming instructions, etc.

Regardless of network device's configuration, it may employ one or more memories or memory modules (such as, for example, memory block 565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the system shown in FIG. 5 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 5) or switch fabric based (such as a cross-bar).

Figure 6:
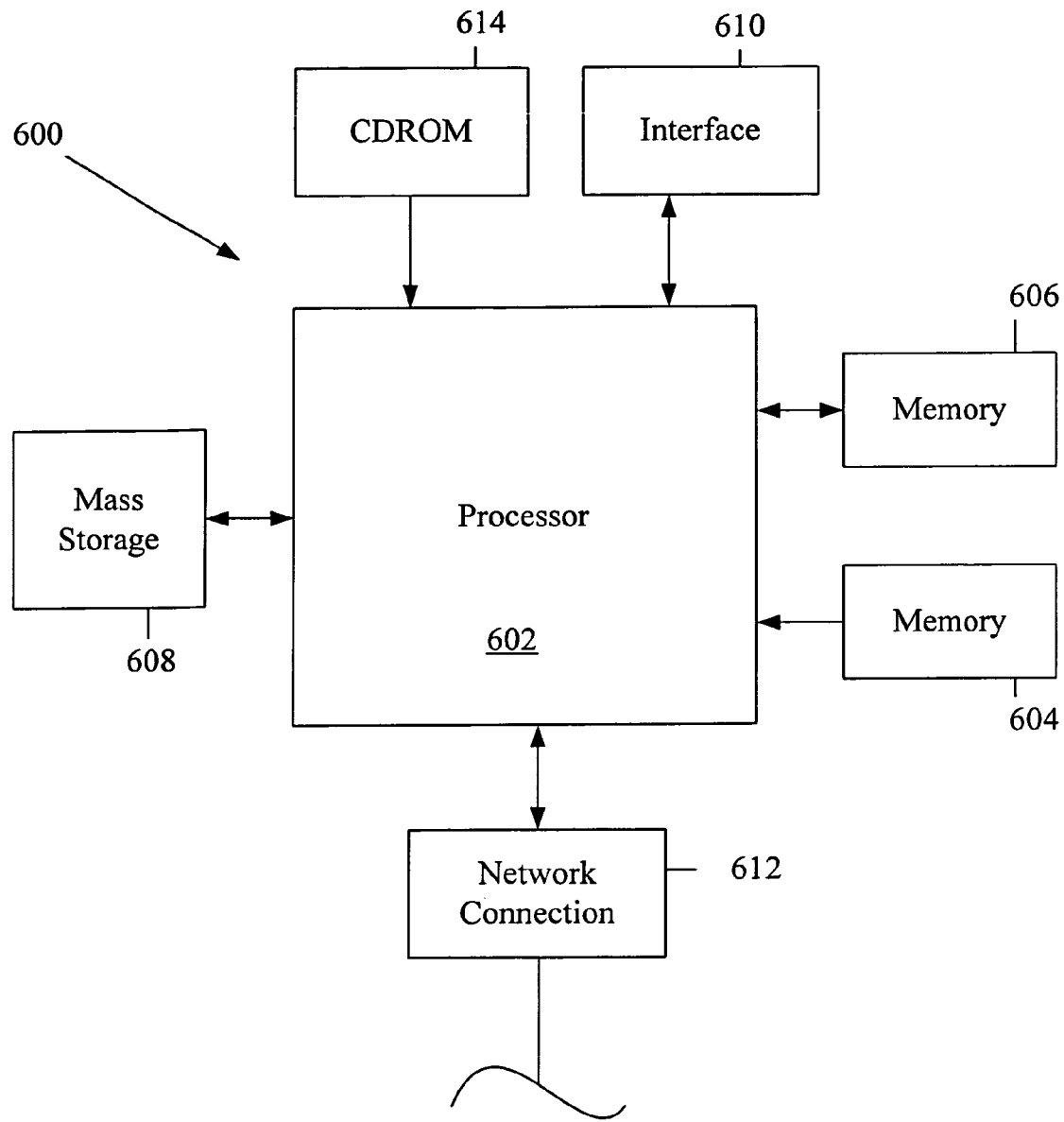
FIG. 6 illustrates an example of a computer that may be configured to implement some methods of the present invention.

FIG. 6 illustrates a computer system that can be used for implementing some embodiments of the invention, e.g., as personal computer 115 of a home network. The computer system 600 includes any number of processors 602 (also referred to as central processing units, or CPUs) that are coupled to devices including memory 606 (typically a random access memory, or "RAM"), memory 604 (typically a read only memory, or "ROM"). As is well known in the art, memory 604 acts to transfer data and instructions uni-directionally to the CPU and memory 606 is used typically to transfer data and instructions in a bi-directional manner.

Both of these memory devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than a RAM or ROM. The mass storage device 608 can be used to hold a library or database of prepackaged logic or intellectual property functions, as well as information on generating particular configurations. It will be appreciated that the information retained within the mass storage device 608, may, in appropriate cases, be incorporated in standard fashion as part of memory 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Figure 1:
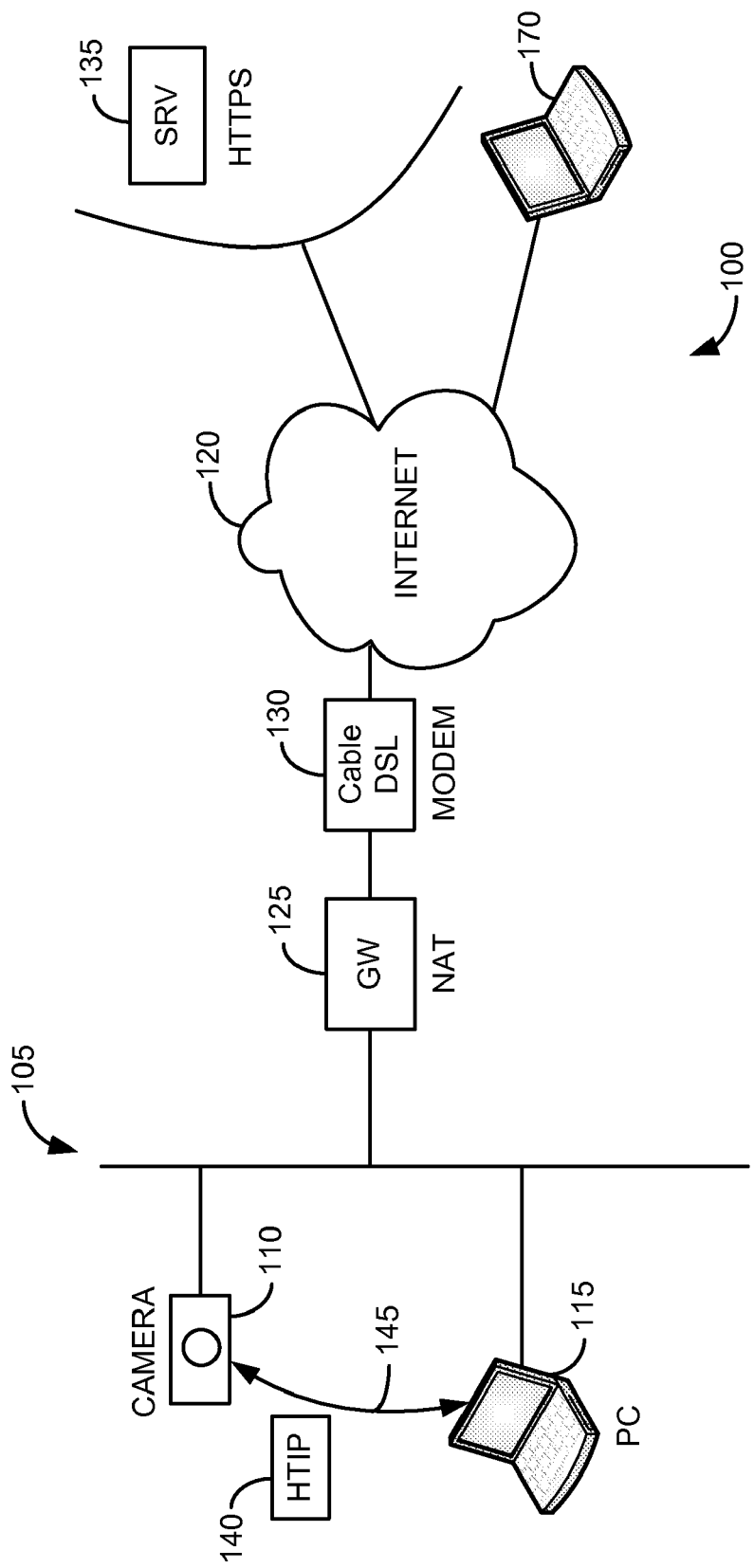
FIG. 1 is a network diagram illustrating a home network.

Finally, CPU 602 is coupled to a network using a network connection as shown generally in FIGS. 1 and 2. Network connection 612 may include, for example, a host bus adaptor (HBA) card, with one side of the HBA connected to the network and the other side connected to a source bus of computer system 600. With such a network connection, it is contemplated that the CPU can receive information from the network, or output information to the network in the course of performing the above-described method steps. According to some implementations of the invention, an HBA card of network connection 612 implements a method according to the invention (e.g., as described above).

The hardware elements described above may be configured (usually temporarily) to act as multiple software modules for performing the operations of this invention. For example, instructions for running a compiler may be stored on mass storage device 608 or 614 and executed on CPU 608 in conjunction with primary memory 606.

Figure 7:
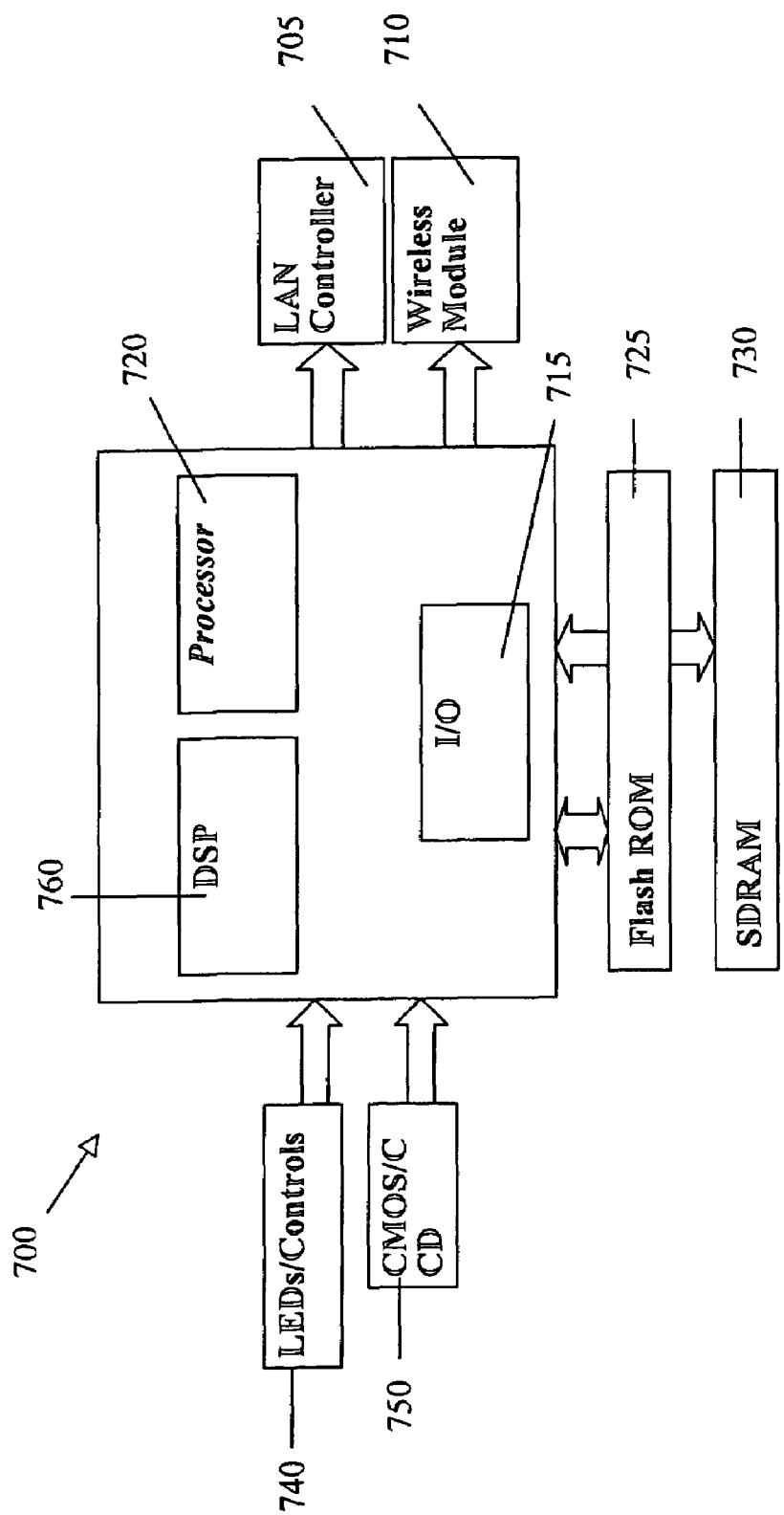
FIG. 7 illustrates an example of a device that may be configured within a home network to implement some methods of the present invention.

FIG. 7 is a block diagram that illustrates device 700 that may be configured within a home network to implement some methods of the present invention. As noted above, device 700 could be one of a variety of devices, but in this example device 700 is a webcam. Device 700 includes LAN controller 705 and wireless module 710, either of which may be used to connect device 700 to the home network. Processor 720 is a central processing unit for device 700. Among other functions, processor 720 is the component that is primarily responsible for providing a form in response to a request from, e.g., PC 215 of FIG. 2. Here, device 700 also includes DSP 760, which is used for image processing. In this example, DSP 760 converts images into a compressed format such as MPEG4 format.

Device 700 also includes flash memory 725 and SDRAM 730. Flash memory 725 stores the commands necessary for initializing device 700. After device 700 has been initialized, many operations of device 700 are performed according to commands stored in SDRAM 730. As will be appreciated by those of skill in the art, I/O controller 715 may represent separate I/O devices for flash memory 725, SDRAM 730, etc.

Because device 700 is a webcam in this example, device 700 includes light detector 750, which may be a CCD or similar device. Device 700 also includes various controls and displays 740, such as a power control, a system reset control, LEDs for indicating the status of device 700, etc.

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method for securely transmitting information to and from a home network, the method comprising:
    making a request on a first device within the home network for a first form at a URL on a second device within the home network, wherein the request is made via a non-secure protocol;
    entering sensitive information in the first form via the first device, the sensitive information pertaining to the second device;
    transmitting the first form to a third device outside the home network from the first device via a secure protocol;
    receiving a second form on the first device from the third device via the secure protocol, the second form containing the sensitive information; and
    sending the second form to the second device via the non-secure protocol.

2. The method of claim 1, wherein the non-secure protocol is HTTP.

3. The method of claim 1, wherein the secure protocol is HTTPS.

4. The method of claim 1, wherein the transmitting step comprises posting the first form to the third device.

5. The method of claim 1, wherein the transmitting step consists of invoking one of a "GET" or "POST" HTTP action command.

6. The method of claim 1, wherein the transmitting step comprises transmitting a return URL for the second device.

7. The method of claim 1, wherein the return URL for the second device is known by the third device prior to the transmitting step.

8. The method of claim 1, wherein the sensitive information is hidden in the second form.

9. The method of claim 1, wherein the sending step is performed by a user of the first device.

10. The method of claim 1, wherein the sending step is automatically performed by the first device.

11. A device configured for use within a home network for securely transmitting information to and from the home network, the device comprising:
    means for making a request within the home network for a first form at a URL on a second device within the home network, wherein the request is made via a non-secure protocol;
    means for entering sensitive information in the first form via the device, the sensitive information pertaining to the second device;
    means for transmitting the first form to a third device outside the home network from the device via a secure protocol;
    means for receiving a second form from the third device via the secure protocol, the second form containing the sensitive information; and
    means for sending the second form to the second device via the non-secure protocol.

12. A computer program embodied in a tangible storage medium and configured to control at least one device within a home network to perform the following steps:
    making a request on a first device within the home network for a first form at a URL on a second device within the home network, wherein the request is made via a non-secure protocol;
    entering sensitive information in the first form via the first device, the sensitive information pertaining to the second device;
    transmitting the first form to a third device outside the home network from the first device via a secure protocol;
    receiving a second form on the first device from the third device via the secure protocol, the second form containing the sensitive information; and
    sending the second form to the second device via the non-secure protocol.

13. A method for securely transmitting information to and from a home network, the method comprising:
    receiving, at a first device within the home network, a request from a second device within the home network, wherein the request is received via a non-secure protocol; and
    providing a first graphical user interface to the second device via the non-secure protocol in response to the request, the first graphical user interface comprising:
    fields or elements for receiving information regarding the first device; and
    a first control configured to transmit the information to a third device outside the home network via a secure protocol in response to a first input from a user of the first device.

14. The method of claim 13, wherein the information includes a URL of the first device.

15. The method of claim 13, further comprising:
    receiving, by the third device, the information; and
    transmitting a second graphical user interface to the second device by the secure protocol, the second graphical user interface comprising a second control configured to transmit the information to the first device via the non-secure protocol in response to a second input from the user of the first device.

16. A device for securely transmitting information to and from a home network, the device comprising:
    means for receiving a request from a second device within the home network, wherein the request is received via a non-secure protocol; and
    means for providing a first graphical user interface to the second device via the non-secure protocol in response to the request, the first graphical user interface comprising:
    fields or elements for receiving information regarding the first device; and a first control configured to transmit the information to a third device outside the home network via a secure protocol in response to a first input from a user of the first device.

17. A computer program embodied in a tangible storage medium and configured to control at least one device within a home network to perform the following steps:

receiving a request via a non-secure protocol from a second device within the home network; and providing a first graphical user interface to the second device via the non-secure protocol in response to the request, the first graphical user interface comprising:

fields or elements for receiving information regarding the first device; and a first control configured to transmit the information to a third device outside the home network via a secure protocol in response to a first input from a user of the first device.

18. A method for securely transmitting information to and from a home network, the method comprising:

receiving, at a first device outside the home network, a request received via a secure protocol from a second device within the home network, the request including information regarding a third device within the home network; and providing a first graphical user interface to the second device via the secure protocol in response to the request, the first graphical user interface comprising a first control configured to transmit the information to the third device in response to a first input from a user of the second device.

19. A computer program embodied in a tangible storage medium and configured to control at least one device outside a home network to perform the following steps:

receiving a request received via a secure protocol from a second device within the home network, the request including information regarding a third device within the home network; and providing a first graphical user interface to the second device via the secure protocol in response to the request, the first graphical user interface comprising a first control configured to transmit the information to the third device in response to a first input from a user of the second device.

* * * * *

UNITED STATES PATENT AND TRADEMARK OFFICE
CERTIFICATE OF CORRECTION

PATENT NO. : 7,650,636 B2  Page 1 of 1
APPLICATION NO. : 10/793535
DATED : January 19, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1673 days.

Signed and Sealed this

Twenty-eighth Day of December, 2010

David J. Kappos
*Director of the United States Patent and Trademark Office*